United States Patent [19]

Fukushima

[11] 4,026,634

[45] May 31, 1977

[54] DIRECTIONAL LIGHT TRANSMITTING SCREEN

[75] Inventor: Yoshio Fukushima, Tokyo, Japan

[73] Assignee: Ricoh Co., Ltd., Tokyo, Japan

[22] Filed: Feb. 28, 1972

[21] Appl. No.: 229,917

Related U.S. Application Data

[63] Continuation-in-part of Ser. No. 47,182, June 18, 1970, abandoned.

[30] Foreign Application Priority Data

June 18, 1969 Japan .............................. 44-48475
Mar. 1, 1971 Japan .............................. 46-10754

[52] U.S. Cl. ............................. 350/128; 350/96 B; 350/167
[51] Int. Cl.² ..................... G03B 21/60; G02B 5/17
[58] Field of Search ......... 350/127, 128, 117, 96 B, 350/96 BC, 96 R, 167

[56] References Cited

UNITED STATES PATENTS

| | | | |
|---|---|---|---|
| 2,154,868 | 4/1939 | St. Genies | 350/128 |
| 2,258,164 | 10/1941 | St. Genies | 350/128 |
| 2,567,656 | 9/1951 | Siezen | 350/128 |
| 2,639,918 | 5/1953 | Hotchner | 350/128 X |
| 3,447,438 | 6/1969 | Kaufer et al. | 350/127 X |
| 3,551,043 | 12/1970 | Neuberger et al. | 350/202 |
| 3,625,584 | 12/1971 | St. John | 350/127 X |
| 3,735,032 | 5/1973 | Goetze et al. | 350/96 B |

OTHER PUBLICATIONS

*The Focal Encyclopedia of Photography* "Lens," p. 631, 1960.
Uchida et al. *IEEE Journal of Quantum Electronics* "Optical Characteristics of a Light–Focusing Fiber Guide and its Applications," vol. QE–6, No. 10, 1970.
Kitano et al. *Journal of the Japan Society of Applied Physics*, "A Light–Focusing Fiber Guide Prepared by Ion–Exchange Techniques," vol. 39, 1970, pp. 63–70, reprinted from 1969.

*Primary Examiner*—Edna M. O'Connor
*Attorney, Agent, or Firm*—Cooper, Dunham, Clark, Griffin & Moran

[57] ABSTRACT

A light transmitting screen capable of directing and focusing light images falling thereon, comprising a plurality of lens systems, each having a particular optical axis, making up the screen elements and each of which transmits parallel light rays incident thereon such that the light rays emerge parallel to each other. The lens systems may be of different refractive powers and have their optical axes disposed in parallel or at varying angles with each other and all are adjacently arranged in the form of a flat, curved or segmented screen with front and rear surfaces. When light is incident upon the screen from one side, the light rays pass through and are directed by the individual systems in accordance with the arrangement of their optical axes and refractive powers, so that many varying optical and lighting effects may be achieved on the other side. Each lens system may comprise a series of suitable lens surfaces arranged on a common optical axis or an optical cylinder or fiber guide.

9 Claims, 36 Drawing Figures

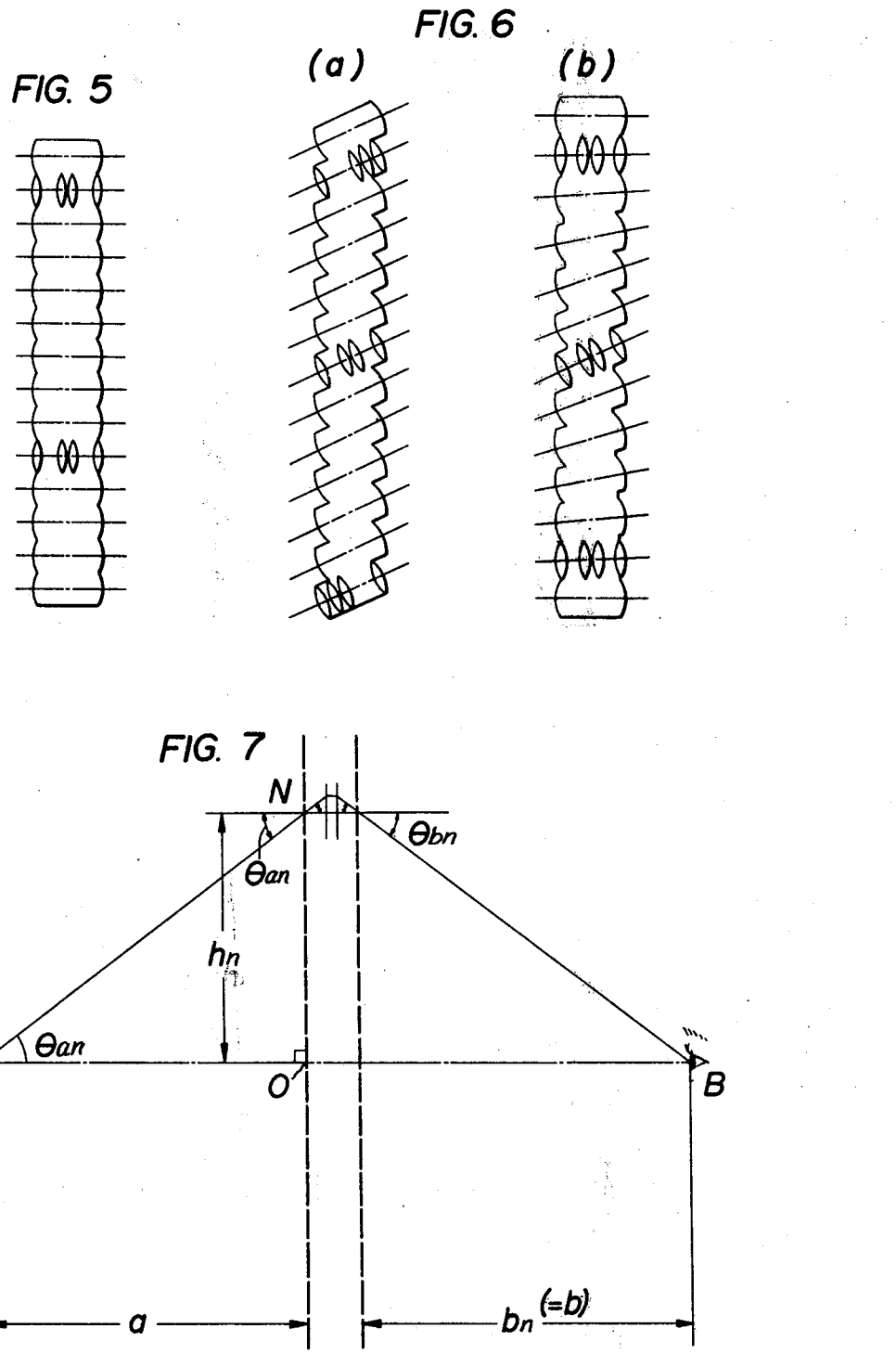

INVENTOR
YOSHIO FUKUSHIMA

BY
ATTORNEY 4,026,634

DIRECTIONAL LIGHT TRANSMITTING SCREEN

CROSS-REFERENCES

This is a continuation-in-part of my co-pending application Ser. No. 47,182, filed June 18, 1970, (now abandoned), with claim of priority based on Japanese application Ser. No. 48,475/69 filed June 18, 1969.

BACKGROUND OF THE INVENTION

This invention relates to a light-transmitting screen and more particularly to a viewing screen which is capable of directing and focusing light images falling thereon.

A directional reflector device is known which comprises a multitude of minute glass balls applied to one surface of the reflector layer. When this device is used as a screen on which a picture is projected for viewing, the rays of light reflected by the screen converge in a position near the projector. Since the reflection by the screen is directional, it is possible to discriminate between the various picture images formed on the screen by a plurality of projectors projecting a plurality of pictures in superposed relationship. Generally, however, the viewer must be positioned near the projectors, so that the projectors may interfere with his field of view.

A screen or light transmitting system wherein a convex lens or Fresnel lens generally referred to as a field lens is utilized, has hitherto been used as a device for viewing picture images without being disturbed by the presence of projectors. However, this screen has a disadvantage in that it is impossible to obtain a large size screen. An additional disadvantage is that the screen itself has a central optical axis so that it is difficult to obtain a good view in any position other than that on the optical axis. Besides, when a plurality of projectors are used for projecting a plurality of pictures, the point of convergence of light rays relative to the projector is symmetrically displaced both vertically and horizontally with respect to the optical axis. Furthermore, a large number of screens must be arranged in the same plane to provide a screen unit of large area. When a picture is projected onto such a screen unit, the rays of light will converge in a number of positions so that it becomes impossible to view the entire image at once in one position.

The aforementioned disadvantages of screens of the light transmitting type comprising field lenses or Fresnel lenses are directional reflector devices utilizing spherical bodies of glass can be obviated if a multitude of screen elements each of which is a small lens system of predetermined size are arranged in a plane to form a large screen of the type which has no optical axis of its own so that rays of light projected from one side on the screen from any position as desired may be transmitted by the screen and made to converge at a number of selected positions or on one spot on the other side of the screen which is disposed in a position corresponding to the position of the projection light source with respect to the screen.

SUMMARY OF THE INVENTION

The present invention embodies a screen of large area comprising a plurality of lens elements of predetermined size, adjacently arranged to constitute a screen having front and rear surfaces. The lens elements are arranged in a series of lens systems, each of which has its own optical axis and transmits parallel light lays incident thereon such that the light rays emerge parallel to each other so that a light image projected from any position on one side of the screen and passing through it can be made to converge in a particular position on the opposite side or the rays of the image may be individually diverted to selected positions if desired. The screen provides distinct directionality or complex directionality that has hitherto been unobtainable with light transmitting screens of the prior art even when the screen has a specific optical axis of its own. Each lens system may comprise a series of suitable lens surfaces arranged on a common optical axis, in the form of a plurality of thin or thick convex lenses, or comprise small optical cylinders known as fiber guides as will be more fully described.

BRIEF DESCRIPTION OF THE DRAWINGS

FIGS. 5, 6a and 6b are sectional views of alternative embodiments of a screen comprising a number of optical systems of the type shown in FIGS. 1 to 4 in accordance with the present invention;

FIG. 7 is a diagram of the optical characteristics of the screen of FIG. 5 when a picture is projected onto it;

DESCRIPTION OF THE PREFERRED EMBODIMENTS

A screen device in accordance with the present invention may comprise a combination of different types of lens elements, each of which elements acts as an optical system. The principles of the invention will first be explained with reference to a conventional thin lens system.

Figure 1:
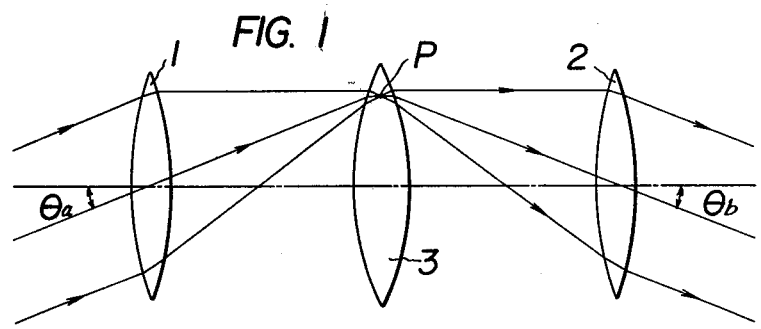
FIG. 1 is a side view of an optical system in accordance with the present invention.

In FIG. 1, lenses 1 and 2 of the same focal length are so arranged that their optical axes are aligned with one another. A lens 3 whose focal length is substantially one-half the focal length of the lenses 1 and 2 is disposed intermediately between them with its optical axis aligned with the optical axes of the lenses 1 and 2. The parallel rays of light incident upon the lenses 1 and 2 focus on the center of the lens 3.

If parallel rays of light are incident upon this optical system at an angle of incidence $\theta a$ with respect to its optical axis, the rays of light will form an image on a point P on its center plane (this may be called the effective center plane of the lens system) and then leave the lens 3 while diverging. Since the lens system is arranged as aforementioned, the ray of light passing through the optical center of the lens 1 (that is, principal ray) will be disposed parallel to the optical axis of the lens system in the lens 3 and pass through the optical center of the lens 2 before leaving it. The angle $\theta b$ formed by the rays of light emerging from the lens system and the optical axis of the lens system, is quantatively equal to the angle of incidence $\theta a$. But the angles of $\theta a$ and $\theta b$ are in different quadrants with respect to the optical axis, that is $\theta b = -\theta a$. The point P at which the image is formed is also in the focal plane of the lens 2, so that the rays of light passing through the point P and incident on the lens 2 emerge therefrom as light of parallel rays. Accordingly, the rays of light other than the principal ray will also form the angle $\theta b = -\theta a$ with the optical axis of the lens system and form parallel rays when they emerge from the lens 2 after forming the image at the point P. This relation holds no matter how the angle of incidence $\theta a$ may vary, so long as the image forming point P is disposed in the lens 3.

Figure 2:
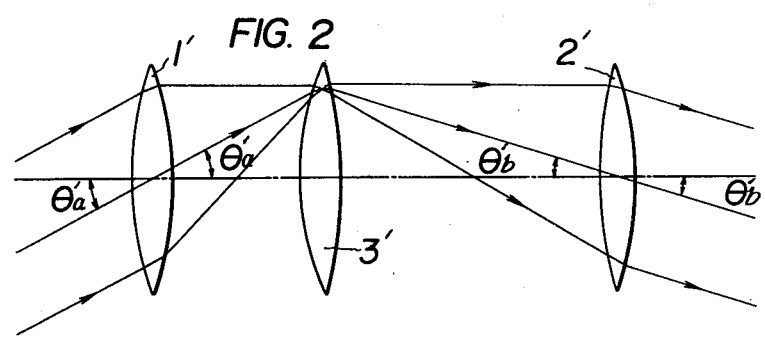
FIG. 2 is a side view of an alternative optical system similar to that of FIG. 1 but arranged asymmetrically.

FIG. 2 shows a lens system similar to that of FIG. 1 but in which the lenses are arranged asymmetrically. The lenses 1', 2' and 3' shown in FIG. 2 have optical axes aligned with one another and the lenses 1' and 2' have their focuses disposed at the effective center plane of the system near the optical center of the lens 3' with the focuses of the lenses 1' and 2' being coincident with one another as in FIG. 1. However, it will be seen that the lenses 1' and 2' have focal lengths which differ from one another, with the focal length of the lens 1' being shorter than that of the lens 2', and the focal length of the lens 3' being such that the ray of light passing through the optical center of the lens 1' passes through the center of the lens 2'. Preferably, the ray of light passing through the optical center of the lens 1' (principal ray) is disposed parallel to the optical axis of the lens system in the lens 3' and passes through the center of the lens 2'. If the lenses are sufficiently thin, the aforementioned relation will be expressed by the following formula;

$$\frac{1}{f_1} + \frac{1}{f_2} = \frac{1}{f_3} \text{ that is, } f_3 = \frac{f_1 \times f_2}{f_1 + f_2} \quad (A)$$

where $f1$, $f2$ and $f3$ are focal lengths of the lenses 1', 2' and 3', respectively. This relation also holds in the system of FIG. 1 in which $f1 = f2 = 2f_3$. If parallel rays of light are incident upon the lens 1' of the lens system of FIG. 2 at an angle of incidence $\theta'a$, an image will be formed at a point P substantially on the center plane of the lens 3' and the rays of light will form parallel rays when they emerge from the lens 2'. The angle of emergence $\theta'b$ formed by the light rays and the optical axis of the lengs system as the former emerge from the system is not equal to the angle of incidence $\theta'a$. The relation between the angles $\theta'a$ and $\theta'b$ will be expressed substantially by the following formula as can be seen from the figure:

$$\frac{\tan|\theta'b|}{\tan|\theta'a|} = \frac{f_1}{f_2} \quad (B)$$

This relation also holds with the lens system of FIG. 1.

Figure 3:
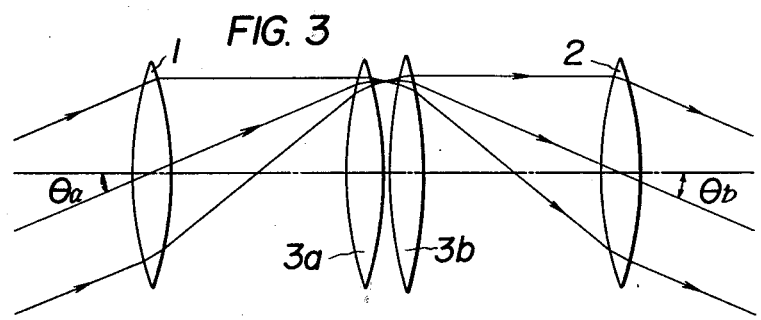
FIGS. 3 and 4 are side views of further alternative optical systems, similar to those of FIGS. 1 and 2.
Figure 4:
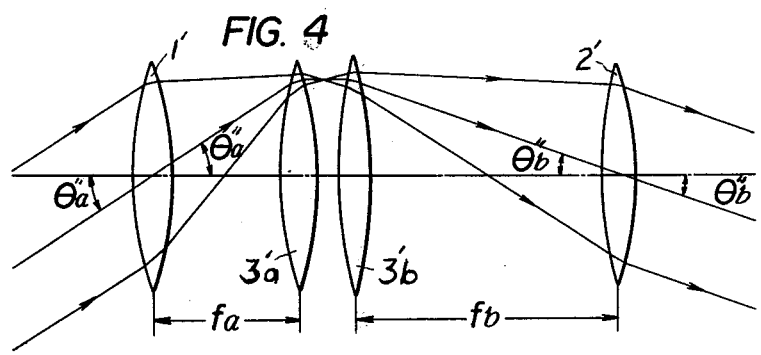

In FIGS. 3 and 4, the lens 3 shown in FIG. 1 is divided into the lenses according to the respective functions to enable the invention to be clearly understood. In practice, this arrangement is advantageous in increasing the efficiency of the lens system.

The optical principles explained with reference to FIGS. 1 and 2 also hold in the lens system of FIG. 3 which comprises, besides the lenses 1 and 2, a lens 3a which has its focus in the center of the lens 1 and a lens 3b which has its focus in the center of the lens 2. The ray of light passing through the center of the lens 1 is disposed parallel to the optical axis of the lens system by the lens 3a and refracted by the lens 3b toward the center of the lens 2 so as to pass through the center of the lens 2 before emerging therefrom. Other rays of light behave substantially in the same manner as explained with reference to FIGS. 1 and 2, so that detailed explanation thereof is omitted. It should be noted, however, that the lenses 3a and 3b need not be disposed in intimate contact with one another. But, if they are spaced apart from one another, as shown in FIG. 4, the aforementioned formula relation to the focal lengths will not hold. The relation between the angle of incidence $\theta''a$ and the angle of emergence $\theta''b$ can be expressed by the following formula:

$$\frac{\tan|\theta''b|}{\tan|\theta''a|} = \frac{f_a}{f_b} \quad (C)$$

where $f_a$ and $f_b$ are the focal lengths of the lenses $3'a$ and $3'b$ respectively.

The ratio $f1/f2$ in the optical system of FIG. 1 or the ratio $fa/fb$ in the optical system of FIG. 4 is constant. Therefore, the ratio $f1/f2$ or $fa/fb$ is herein termed the refractive power P of the lens system. If $P = 1$, the absolute value of the angle of incidence with respect to the optical axis is equal to the angle of emergence with respect to the optical axis or $|\theta a| = |\theta b|$. If $P < 1$, the absolute value of the angle of incidence will be greater than the absolute value of the angle of emergence or $|\theta a| > |\theta b|$; if $P > 1$, the absolute value of the angle of incidence will be smaller than the absolute value of the angle of emergence or $|\theta a| < |\theta b|$. Thus, an element with $P > 1$ can be said to have a greater refractive power than an element with $P < 1$. Generally, when the relation $P > P'$ holds, an element having a power P shall be referred to here as having a greater refractive power than an element having a power $P'$.

Figure 20:
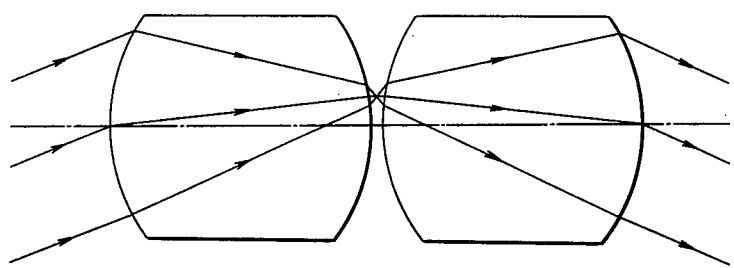
FIG. 20 is a side view of a lens element of this invention showing one example of the lens system using thick lenses.
Figure 21:
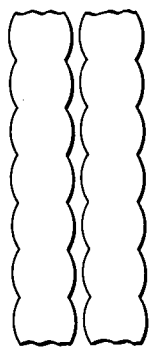
FIG. 21 is a fragmentary side view of the screen comprising one embodiment of this invention in which the screen consists of two plastic plates.

The present invention provides an aggregate structure (hereinafter referred to as a screen) consisting of a multitude of elements having optical properties as mentioned above, such elements being so arranged that their optical axes are parallel to one another as shown in FIG. 5 and FIG. 6a, or so arranged that their optical axes are tilted with respect to one another in functional order as shown in FIG. 6b; all the elements being disposed in one plane irrespective of the arrangement of their optical axes. All the elements making up a screen as aforementioned, need not have the same refractive power. For example, the elements making up a screen of a limited area may have refractive powers which becomes increasingly greater from one end of the screen to the other end; or two or more types of elements varying from one another in refractive power may be combined with one another at an optional rate. Each component of the systems shown in the drawings need not be a single lens, but also may be a doublet or a triplet, or only one surface of a thick lens as shown in FIG. 20. A screen composed of a group of lenses or elements gathered together may be formed of plastic plates such as plates of acrylic resin. It will be appreciated from FIG. 20 that the screen according to this invention should be composed of at least two plates, each of which comprises a plurality of closely adjacent lens surfaces on both sides, and which are closely adjacent to one another (see FIG. 21). The screen of this invention is not necessarily flat but also can be curved gently.

The operation and effect of preferred embodiments of the screen constructed as aformentioned will now be described with reference to FIGS. 7 and following. FIG. 7 shows an optical diagram of the screen shown in FIG. 5 on which a picture is projected by a projector A spaced apart from the screen by a distance $a$. Not all but some of the elements of the screen are shown in FIG. 7 and the center plane of each component lens system is represented by a straight line in the interest of brevity.

Let us assume that a beam of rays which is incident or any one N of the elements in the screen at an angle of incidence $\theta an$ passes through the screen and emerges therefrom at an angle $\theta bn$ so as to reach a point B disposed on the extension of a lline AO normal to the screen. In the arrangement mentioned above, the following relation holds:

$$\tan|\theta an| = \frac{hn}{a} \quad \tan|\theta bn| = \frac{hn}{bn}$$

$$\frac{\tan|\theta bn|}{\tan|\theta an|} = \frac{a}{bn} \quad (D)$$

wherein $bn$ is the distance between the point B and the screen; $hn$ is the height of the portion of the screen between the point O and the element N; $fa$ is the focal length of the lens 3a of the element N; and $fb$ is the focal length of the lens 3b of the element N. The left term of this equation is equal to the ratio $fa/fb$ or the refractive power of the element N as aforementioned. Therefore, $$bn = a \times \frac{1}{P} \text{ (constant)}.$$

Thus, the value of $bn$ will be constant if all the elements have the same refractive power P. If $bn = b$, the light rays of the picture projected from the point A will converge at the point B disposed on the extension of the line AO which is spaced apart from the screen by the distance $$b = a \times \frac{fb}{fa}.$$

Accordingly, if the eyes of a viewer are disposed at the point B, it will be possible to see the light rays from all the points on the screen, so that the picture in its entirely comes into view at this point. If the eyes are disposed at any one of the other points than the point B, it will be impossible to see the picture on the screen in its entirety.

It should be noted that as can be seen from FIG. 1 the light rays on the exit side of one element are reversed in position vertically and horizontally from the light rays on the entrance side, so that when a picture is projected on the screen as shown in FIG. 7 diversion of the light rays occurs in each element. Therefore in order that a good picture may come into view, the size of the element must be smaller than the resolving power of the eyes when seen at a distance of $b$. Assuming that the range of clear vision is 25 centimeters and that the minimum distance between closely adjacent points which the human eyes can recognize as two distinct points is about 0.2 millimeter, the spacing between the elements should be less than about 8 millimeters when the distance $b$ is 10 meters. Another feature that should be taken into consideration in connection with the aforementioned fact is that if the distance $a$ is so great relative to the size of the elements that the diverging light rays from the projector can be regarded as substantially parallel light rays when they pass through each element in the position of the screen, the value of the distance $a$ will not be limited to a specific level. That is, the value of the distance $b$ can be set by the aforementioned ratio relative to any value of the distance $a$.

Figure 8:
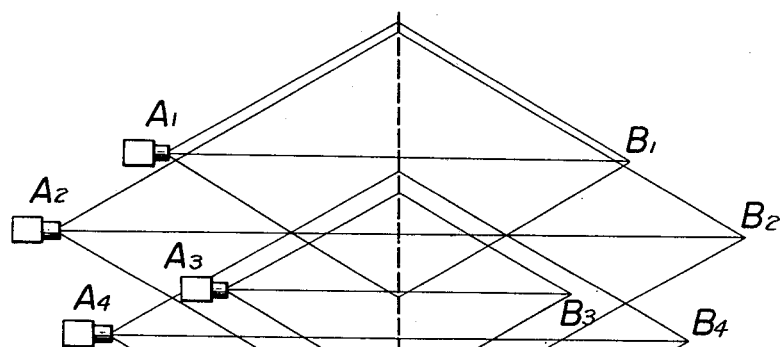
FIGS. 8, 9 and 10 are diagrams of the optical characteristics of the screen of FIG. 5 when a plurality of projectors arranged in different manners are used for projecting pictures onto the screen.

FIG. 8 shows an embodiment of the invention in which the aforementioned feature is utilized to good advantage. In the figure, a plurality of projectors are arranged on one side of the screen in relative positions which may be selected in any way as desired. The figure may be regarded as a plan view or a side view. It will be seen from FIG. 8 that if the distances between the projectors and the screen are sufficiently great relative to the size of the elements, a plurality of beams of light projected in superposed relation on the screen will be separated and converge at respective corresponding points on the other side of the screen without being interferred with by the projectors.

Figure 9:
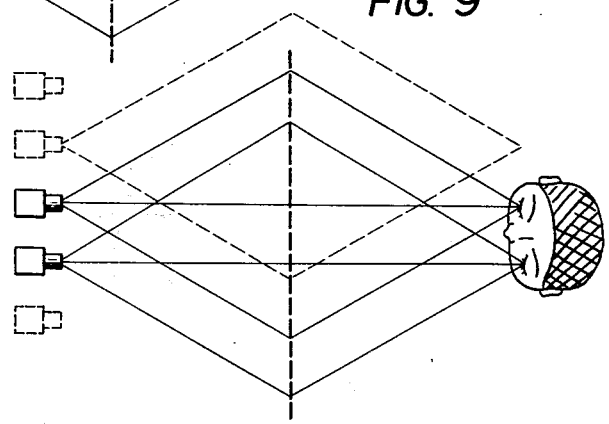
Figure 10:
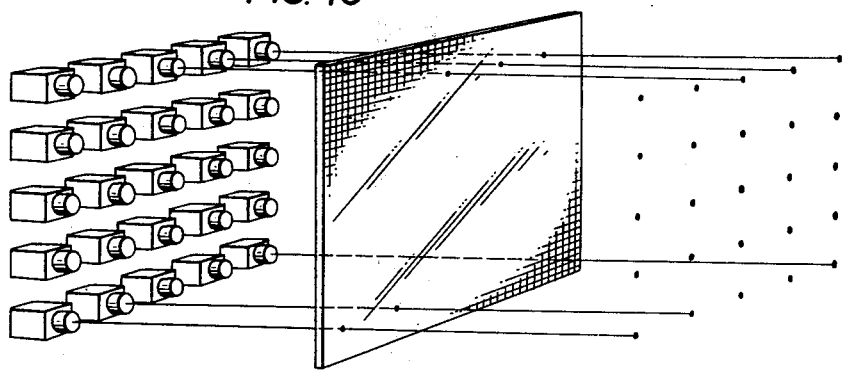

FIG. 9 shows two projectors in full lines and three in dotted lines arranged side by side in a row parallel to the screen and spaced apart a suitable distance from one another. If stereoscopic slides are inserted in the two full-line projectors and projected on the screen, a viewer on the opposite side of the screen will be able to see stereoscopic pictures. If a series of slides containing continuous pictures are inserted in the successive projectors arranged in a row and projected on the screen, a viewer on the opposite side of the screen will be able to see continuous stereoscopic pictures by moving his eyes. If the projectors are arranged as shown in FIG. 10, the three dimensional effect of pictures seen by the viewer can be increased.

Figure 11:
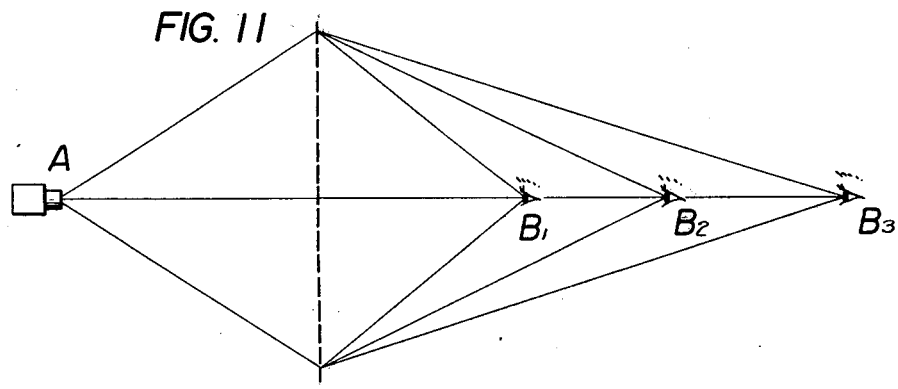
FIG. 11 is a diagram of the optical characteristics of a screen comprising a plurality of systems of different properties.

FIG. 11 shows the optical characteristics of an embodiment of the invention wherein the screen comprises a number of elements of different refractive powers. In the figure, three types of elements different from one another in refractive power coexist in one screen.

Figure 12:
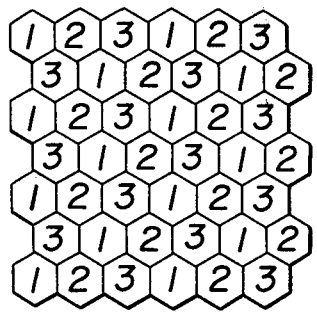
FIG. 12 is a front view of one embodiment of the screen of FIG. 11.

The elements of FIG. 11 may be arranged in an orderly manner, and may be of honey-comb shape as shown in FIG. 12. The numerals 1, 2 and 3 in the figure refer to elements of different types. If a picture is projected from a projector disposed at the point A in FIG. 11 on the screen of FIG. 12, the same picture can be seen at points B1, B2 and B3.

If the screen of FIG. 11 is so composed that some symbols or patterns are formed by the elements of different refractive powers, the different symbols or patterns can be seen at the points B1, B2 and B3 by throwing light of uniform intensity from the point A without the need for inserting a picture into the projector.

Figure 13:
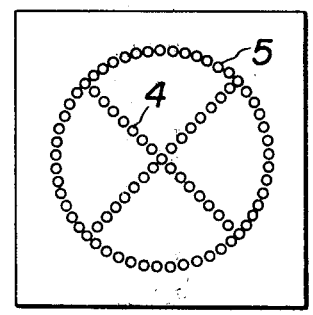
FIG. 13 is a front view of a screen consisting of two types of elements of different properties, one type of elements being arranged to form one symbol and the other type of elements being arranged to form another symbol.
Figure 14:
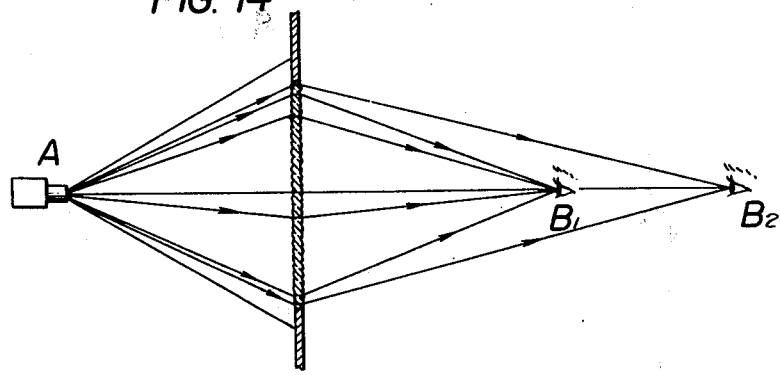
FIG. 14 is a diagram of the optical function of the screen of FIG. 13 when rays of light are incident upon it.

FIG. 13 shows an embodiment of the invention wherein elements 4 are used to form a symbol X and elements 5 are used to form a symbol O on the screen, with the rest of the screen being opaque. FIG. 14 shows the optical characteristics of the embodiment of FIG. 13. If a filter of red body bordered by a green circle is inserted in place of a slide in the projector disposed at the point A in FIG. 14 and light is thrown on the screen constructed as shown in FIG. 13, a viewer can see the symbol X in red color at the point B1 and the symbol O in green color at the point B2. Thus, in this embodiment, different symbols or patterns on the same screen can be seen in different positions and in different colors. In this case, if the same number of light sources as the number of colors used are arranged on one side of the screen to throw light on the screen, then it is possible to switch on and off the light sources as desired to let the viewer see one after another the symbols or patterns in different colors.

If desired, the elements of different refractive powers arranged to form different symbols or patterns may have different colors.

Figure 15:
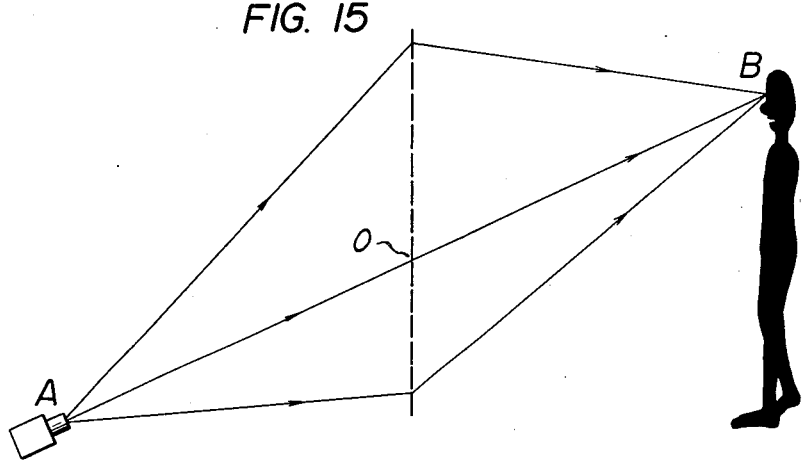
FIG. 15 is a diagram of the optical characteristics of the screen of FIG. 6.

FIG. 15 shows an embodiment of the invention wherein the elements making up the screen have optical axes which are not normal to the surfaces of the screen as shown in FIGS. 6a and 6b. In this embodiment, the elements making up the screen may be so arranged that the optical axes of all the elements are disposed parallel to the line AB as is the case with the elements of FIG. 6a, and the refractive powers of the elements increase from the bottom of the screen to the top thereof, alternatively elements of the same refractive power may be used and arranged to make up the screen such that the optical axis of the element at the point O is along the line AB but the angles formed by the optical axes of the other elements and the plane of the screen become increasingly greater in going from the point O to the top or bottom of the screen and grow nearer to 90°, as shown in FIG. 6b, in order that the light rays thrown from the point A may converge at the point B. If the screen is constructed in this way, it is possible to throw light from a point on the floor onto the screen arranged vertically on the floor and let the light rays converge at a point which is at the level of the eyes of a standing viewer on the opposite side of the screen. In this case, there are limits to the relative positions of the points A and B with respect to height but the projector is free to move transversely of the screen to achieve the same effect. Thus, it is possible to arrange a plurality of projectors in side by side relation in a row parallel to the screen.

Figure 16:
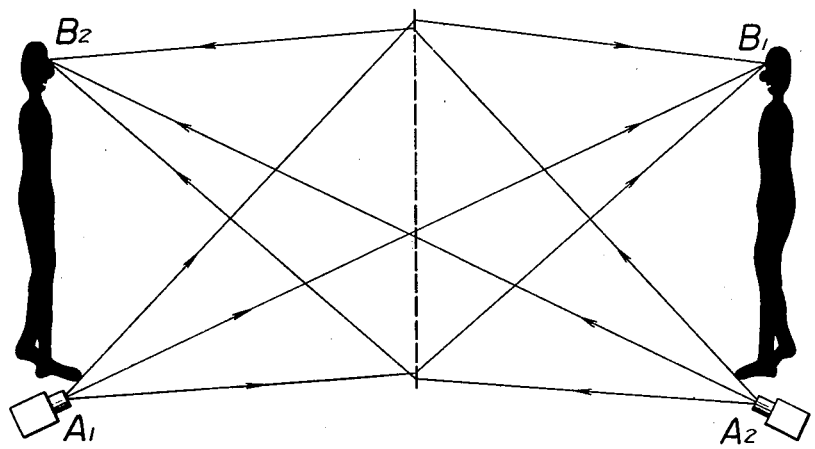
FIGS. 16 and 17 are diagrams showing alternative uses of the screen of FIG. 15.

FIG. 16 shows an embodiment of the invention wherein the screen consists of a combination of two lens groups, one of which is a group of elements such as described with reference to FIG. 15 and the othr of which is a group of elements obtained by turning up side down the elements described with reference to FIG. 15, such elements being arranged in any orderly manner. As shown, pictures are simultaneously thrown on opposite surfaces of the screen from points disposed on opposite sides with respect to the screen. This arrangement permits viewers on opposite sides of the screen to see different pictures without being interferred with by the projectors. The distance between the projector disposed at the point A1 and the screen may be equal to or different from the distance between the projector disposed at the point A2 and the screen, and the distance between the point B1 and the screen may be equal to or different from the distance between the point B2 and the screen. The light rays thrown by the projector at the point A1 converge at one more point other than B1 but such point of convergence is disposed below the point A2 so that it is not in the field of view of the viewer. This is also the case with the light rays thrown by the projector disposed at the point A2.

Figure 17:
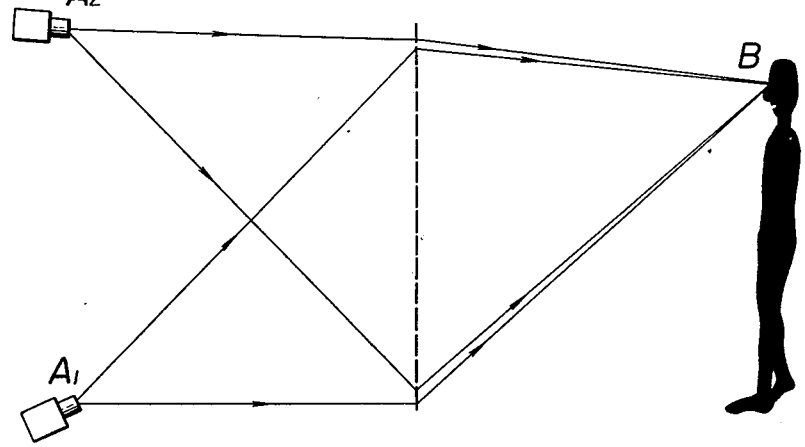

FIG. 17 shows an embodiment of the invention in which the screen consists of a combination of two lens groups, one of which is a group of elements such as described with reference to FIG. 15 and the other of which is a group of elements whose properties are such that the light rays thrown by the projector disposed in the position A2 disposed above the projector in the position A1 converge at the point B, such elements being arranged in any orderly manner. As shown, pictures are simultaneously or alternatively thrown on the screen constructed as aforementioned from the floor and ceiling. In this case, the pictures projected on the screen by the two projectors disposed at the point A1 and A2 respectively can be seen simultaneously at the point B on the opposite side of the screen. This gives the viewer an illusory sense of movement by projecting two pictures in superposed relation and turning on and off the projectors. This also makes it possible to let different viewers see different pictures by turning on and off the projectors.

The same optical limits are set to the embodiment of FIG. 16 and the embodiment of FIG. 17. It is possible to form a screen by using a combination of the elements described with reference to FIG. 16 and FIG. 17. In this connection, it should be noted that, of the four points at which the light rays thrown by the projector disposed at the point A1 converge, three points are disposed under the feet of the viewer so that they do not interfere with viewing of the picture by him.

In FIG. 17, if the viewer is replaced with a projector and the projectors are replaced by viewers, the arrangement obtained is substantially similar to that of FIG. 11 in that the light rays thrown from one point converge at a plurality of points. This arrangement is more advantageous than that of FIG. 11 because the plurality of points of convergence are not disposed on a line normal to the screen as is the case with the arrangement of FIG. 11.

If the elements shown in the pattern of FIG. 13 are arranged such that the group of elements 4 correspond to the arrangement of elements causing the light rays from the projector at the point A1 to converge at the last point B in FIG. 17 and the group of elements 5 are arranged in a manner corresponding to the arrangement of elements causing the light rays from the projector at the point A2 to converge at the point B in FIG. 17, then it is possible to let the viewer see different symbols at the point B by turning on and off light sources for the projectors which may illuminate the screen uniformly. Such arrangements may, if it is possible to obtain a sufficiently small lens array in the screen, have application in giving warning in the finder of a photographic camera with respect to exposure or changing field frames for interchangeable lenses.

The embodiments of this invention explained with reference to FIGS. 7 and 17 have optical characteristics which have hitherto been unobtainable with prior art devices. It will be appreciated from the foregoing description that this invention can have a variety of applications and achieve excellent results particularly when used for display and advertisement purposes.

Figure 18:
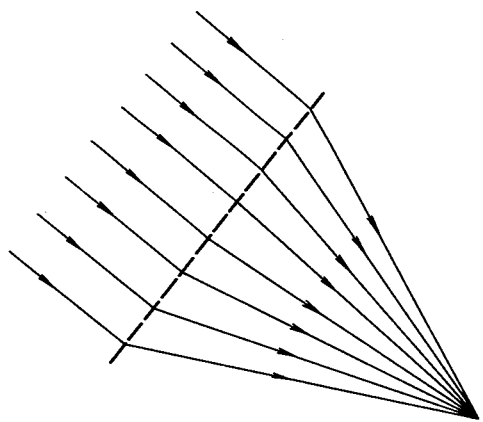
FIG. 18 is a diagram of the application of this invention in a sun oven.

The optical characteristics of the present invention may be utilized to form a converging system or illumination system. FIG. 18 shows a device for bringing the sun's rays to one point in a so-called sun oven in accordance with this invention. It has hitherto been customary to use a parabolic reflector in such devices. Such conventional devices have disadvantages in that difficulties are faced in supporting a sample material near the focus and that limits are set to the operation near the focus. In the case of conventional devices using a lens or Fresnel lens, it has been difficult to provide a lens of large lens aperture. In the device according to this invention, the optical axes of the elements making up the screen are so arranged that the parallel sun's rays incident on the screen converge at a predetermined point or focus region. This makes it possible to prepare the screen as a lens assembly of a large lens aperture almost free from aberration and in the form of a planar plate. This type of device is extremely useful.

Figure 19:
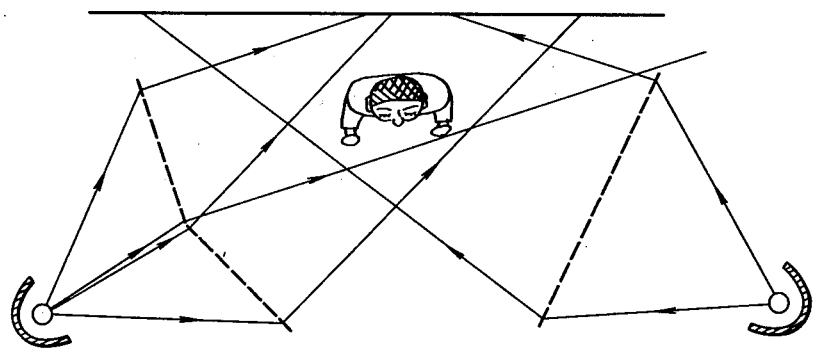
FIG. 19 is a plan view of the application of this invention in studio illumination.

FIG. 19 shows an embodiment of this invention wherein a plurality of screens are used as an illumination system in a studio in taking pictures of a model and the like. A screen disposed on the right side of the figure is constructed such that when illumination light is thrown on the screen the light rays converge at a point spaced apart a greater distance from the screen than the subject. In this application, the light rays emerging from the lens elements may deviate, if slightly, from being parallel to one another even though the light rays incident on the lens elements are parallel to one another. By this arrangement, the shadow of the subject formed on the floor (or in the rear of the subject) is tapered and becomes less sharp than otherwise. Besides, this arrangement provides better results than conventional illumination relying on diffusion reflection by means of a white reflector.

The screen shown on the left side of the figure is slightly bent in the center. This screen may be formed by bending the screen shown on the right side of the figure. However, the bent screen shown on the left side of FIG. 19 is formed by removing the central portion from the screen of FIG. 18 and connecting the remaining two portions at opposite ends at an angle in accordance with the width of said removed portion. The right and left portions of the screen formed in this way have respective focuses, but the angle at which the two portions are connected to one another is set such that the two focuses coincide with each other. If a light source is disposed at the point of focus, the light rays will become parallel to one another and illuminate the subject after passing through each said portion of the screen. By arranging the screen in two portions disposed at an angle to each other as shown, the subject will be subjected to parallel light rays coming from two directions, so that the subject will cast a soft shadow. Thus, this arrangement permits, by using one light source, the achievement of results that might be accomplished by using two light sources. It is possible to provide highly efficient soft light for the purpose of illumination. It is to be understood that the invention is not limited to the type of screen described, and that the screen used for this purpose may consist of a combination of two upper portions of the screen shown in FIG. 5 with one of them being disposed upside down. Such screen need not be bent in the center but may be planar and yet it has similar optical charcteristics. Some disadvantages are associated with the foregoing screen arrangement. Difficulty may be encountered in aligning the lens segments on the optical axis to form the lens for one screen element. In the current state of the art, it is difficult to obtain a lens having an aperture less than 3 mm. When a screen composed of the aforesaid screen elements or lenses arranged in one plane is made of a synthetic resinous material, the screen may tend to buckle and it is generally difficult to obtain dimensional stability of such a plastic screen. Realization of the benefits derived from the use of directional light transmitting screens in practice may be hampered by these difficulties.

Another embodiment of the present invention, obviating the disadvantages of the foregoing screen arrangement, comprises a screen constructed of a multitude of very small optical cylinders, capable of attaining as good light ray convergence as convex lenses, and with opposite end surfaces disposed in planes parallel to each other and normal to the axis. Optical cylinders or fiber-optics of suitable light ray converging ability are of the type described as self-focusing fiber-optics in Japanese Patent Publication No. Sho 45-40321 and Japanese Patent Publication No. Sho 45-40322. They are also known as SELFOC (trade name) which have a diameter ranging from 0.2 to 2 mm.

As the present invention utilizes the lenticular properties of the aforesaid fiber-optics, the screen elements making up the directional screen according to this invention shall hereinafter be referred to as fiber guides.

Figure 22:
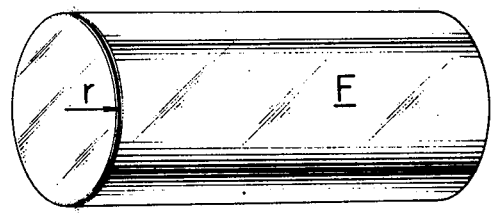
FIG. 22 is a perspective view of one form of fiber guide which serves as a lens or screen element of the directional screen according to this invention.
Figure 23:
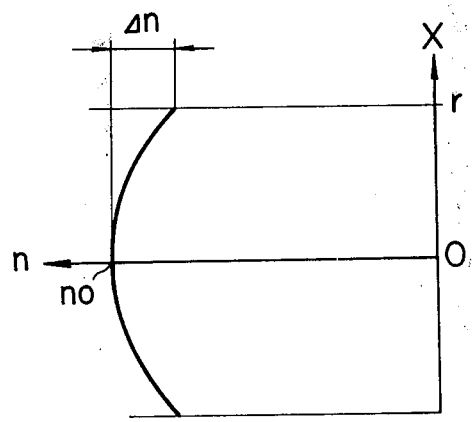
FIG. 23 is a diagram in explanation of the indices of refraction of the fiber guide of FIG. 22.

Before describing a directional screen according to this invention, the optical properties of the fiber guides which are used as screen elements in making up this screen will be explained. The plot in FIG. 23 diagrammatically shows that a fiber guide F of a radius $r$ such as shown in FIG. 22, has an index of refraction which continuously changes in going from its center O to its outer peripheral surface. It is shown that the fiber guide F has an index of refraction $n_o$ at the center and an index of refraction $(n_o - \Delta n)$ at the outermost peripheral surface. Assuming that the index of refraction of the fiber guide F at any point between the center and outermost peripheral surface or at a point spaced from the center O a distance X, for example, is $n$, the following relation holds:

$$n = n_o(1 - \tfrac{1}{2} aX^2) \quad (1)$$

where $a$ is a positive constant.

By substituting $r$ for the $X$ in formula (1), the following relation is established:

$$\Delta n = \tfrac{1}{2} ar^2 n_o \quad (2)$$

Figure 24:
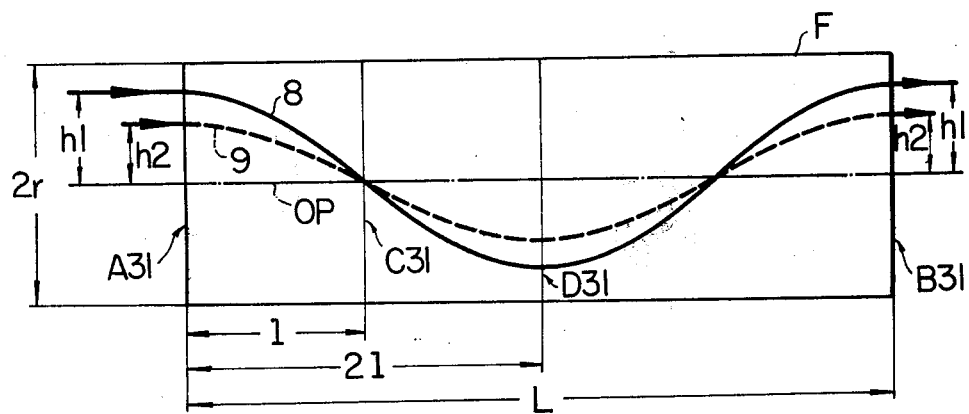
FIG. 24 is a view illustrating the manner in which rays of light incident on one end of a very small optical cylinder serving as a fiber guide move through the cylinder.
Figure 25:
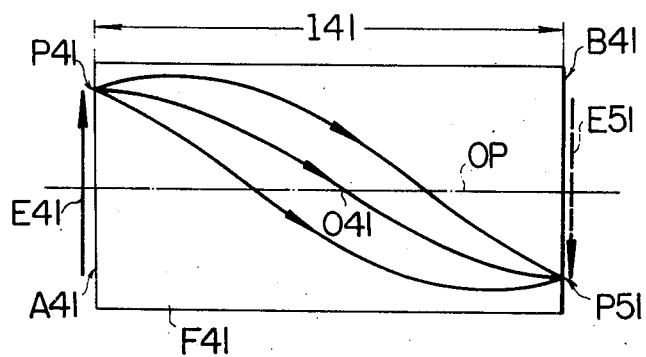
FIG. 25 is a view showing that the very small optical cylinder of FIG. 24 performs the same function as a spherical lens.
Figure 26:
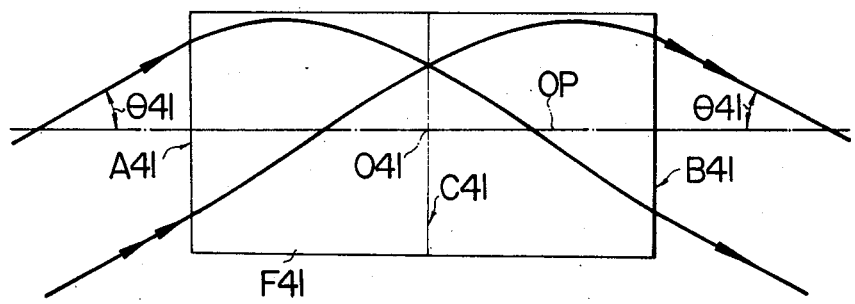
FIG. 26 is a view illustrating the manner in which rays of light move through a fiber guide of the symmetrical type which may make up the directional screen according to this invention.

According to the report by Uchida, Furukawa, Kitano, Koizumi and Mastsumura appearing in the magazine "IEEE Journal of Quantum Electronics" October 1970 issue, pages 606 to 612 a fiber guide constructed as aforesaid has properties such that rays of light move through it in the manner shown schematically in FIGS. 24 to 26.

More specifically, when rays of light 8 and 9 parallel to a center axis Op (hereinafter referred to as the optical axis) and spaced distances $n2$ and $h2$, respectively therefrom, are incident on one end surface A31 of fiber guide F as shown in FIG. 24, the two rays 8 and 9 move through the guide in cosine curves having the same periodicity with respect to the optical axis Op, which is their base line, although their amplitudes vary from each other. If the fiber guide F has a length which is equal to the length L of the period, then rays 8 and 9 emerge from the other end surface B31 of the guide in parallel to the optical axis Op at points spaced apart from the optical axis distances of $h1$ and $h2$ respectively. The length L and the constant $a$ satisfy the following relation with each other:

$$a = \frac{4\pi^2}{L^2} \text{ or } L = \frac{2\pi}{\sqrt{a}} \quad (3)$$

Generally, when rays of light are incident on one end surface of a fiber guide of any given properties and length as desired, and at certain angles and heights, they move through the guide following paths of sine curves or parts thereof having a period length L which is determined by formulas (1), (2) and (3). However, if the angles of incidence of rays of light on one end surface of the fiber guide are too large, they will reach the outermost peripheral surface of the fiber guide and emerge therefrom. In case the angles of incidence exceed the critical angle, they will be reflected by the outer peripheral surface. Thus, maximum light transmittable incidence angles may vary depending on the given properties of the particular fiber guides.

Now, assuming that a cross-section C31 at right angles to the optical axis is taken in the fiber guides F of FIG. 24 in a position spaced apart from one end surface $A_{31}$ a distance $l = \tfrac{1}{4} L$, it will be seen that rays of light 8 and 9 both pass through the optical axis Op at cross-section C31. That is, parallel rays of light incident on one end surface A31 and parallel to the optical axis Op, converge at a point on the optical axis Op at which the cross-section C31 intersects the optical axis Op. Likewise, when parallel rays of light are incident on one end surface A31 at a certain angle with respect to the optical axis Op, the rays of light converge at a point in the cross-section C31 but spaced apart from the optical axis Op a distance which will vary depending on the angle of incidence of the parallel rays of light.

Next consider a cross-section D31 taken at right angles to the optical axis in the fiber guide F of FIG. 24 which is spaced apart a distance $2l$ from one end surface A31 or which is disposed at the geometric center of the fiber guide. As is clear from the nature of any half-period of a sine curve, the distances from the optical axis and the angles thereto of rays of light which pass through the cross-section D31 are symmetrical with the distances from the optical axis and the angles thereof of rays of light incident on the end surface A31. That is, when a half-period of a sine curve in any phase is considered, it will be seen that the distance from the optical axis to one end of the half-period is equal in absolute value to the distance from the optical axis to the other end of the half-period, and the sides on which the curve is disposed with respect to the optical axis Op (positivity or negativity) are reversed. At the same time, the line tangent to the curve at one end is equal in gradient to the similar tangent line at the other end and their signs (positive or negative) are reversed. These relations are shown in concrete form in FIG. 25 and FIG. 26.

FIG. 25 shows the paths of rays of light moving through a point P41 on one end surface A41 of a fiber guide F41 having a length $L_{41} = \tfrac{1}{2} \cdot L$. It will be seen that the rays of light moving from the point $P_{41}$ into the interior of the fiber guide form portions of sine curves of equal period. Accordingly, the rays of light converge at a point $P_{51}$ on the other end surface $B_{41}$ with points $P_{41}$ and $P_{51}$ being symmetrical to each other in positions on the optical axis Op with respect to the centerpoint $O_{41}$. Thus, if any object or image $E_{41}$ is disposed on one end surface $A_{41}$ of the fiber guide $F_{41}$, an inverted real image $E_{51}$ of such object or image will be formed on the other end surface $B_{41}$.

FIG. 26 shows parallel rays of light incident on one end surface $A_{41}$ of the fiber guide $F_{41}$ at an angle $\theta_{41}$ with respect to the optical axis Op. FIG. 26 illustrates two optical properties of the fiber guide. One is that such rays of light converge on a transverse section $C_{41}$ taken at right angles to the optical axis and containing the center $O_{41}$ of the fiber guide, and the other is that rays of light emerging from the fiber guide at the other end surface $B_{41}$ are parallel to and at the same angular relation with the rays of light incident on end surface $A_{41}$ as if the rear half portion of the guide were folded back at the cross-section $C_{41}$ onto the front half portion thereof.

A more detailed explanation and description of fiber guide phenomena may be found in the magazine and Japanese patent publications referred to above.

Figure 27:
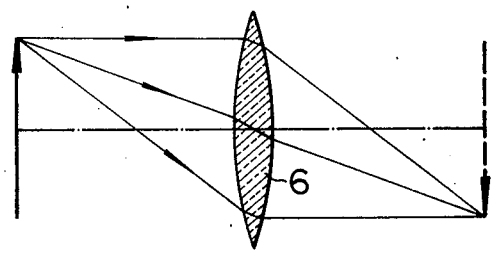
FIG. 27 is a sectional view of a single lens for comparison with the optical cylinder of FIG. 25.
Figure 28:
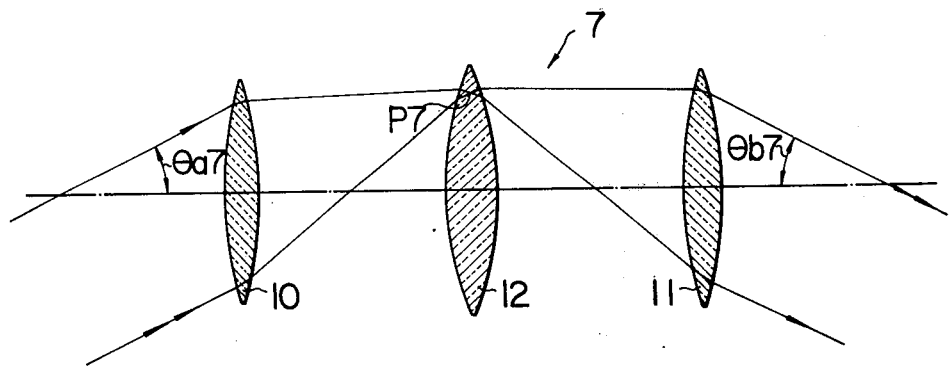
FIG. 28 is a sectional view of a lens system for comparison with the fiber guide of the symmetrical type shown in FIG. 26.

The optical properties and operation of a fiber guide having opposite end surfaces disposed in planes parallel to each other and normal to the axis of the guide will now be described in comparison with those of, a thin spherical lens and lens system such as shown in FIG. 27 and FIG. 28.

The optical properties and operation of the fiber guide $F_{41}$ shown in FIG. 25 may be considered to be similar to those of a convex lens 6 of the focal length $L_{41}$, and the fiber guide shown in FIG. 26 is considered to have the same properties and operation as an erect real image lens system 7 such as shown in FIG. 28. (which is similar to the system of FIG. 1)

In FIG. 28, lens elements 10, 11 and 12 are arranged such that their optical axes are aligned with one another. Lens elements 10 and 11 have the same focal length, and the focal length of lens element 12 is about one-half that of lens elements 10 and 11. Lens elements 10 and 11 are disposed symmetrically with each other with respect to lens element 12 and at positions which are spaced apart from lens element 12 a distance corresponding to twice the focal length of the latter. Parallel rays of light incident on lens elements 10 and 11 are focused on the center of lens elements 12.

If parallel rays of light are incident on the lens system of FIG. 28 at an angle $\theta_{a7}$ with respect to its optical axis, the rays of light will converge on a point P7 on the center plane of lens element 12 and emerge from lens elements 12 while diverging. A ray passing through the optical center of lens element 10, that is, a principal ray, will be parallel to the optical axis of the lens element within lens element 12 and emerge from the lens system after passing through the optical center of lens element 11. An angle $\theta_{b7}$, formed by emerging rays of light and the optical axis of the lens system, is equal to the angle of incidence $\theta_{a7}$ in absolute value and reversed in the direction relative to the optical axis (right-handed and left-handed), that is, $\theta_{b7} = -\theta_{a7}$.

The image forming point P7 is in the focal plane of lens element 11, so that rays of light emerging from point P7 move in parallel to one another after passing through lens element 11. Thus, of the rays of light forming an image at point P7, other rays than the principal ray move in parallel to one another and at the same emergence angle $\theta b7 (= -\theta a7)$ after passing through lens element 11. This relationship holds as long as the image forming point P7 is disposed in lens element 12, no matter how the incidence angle $\theta a7$ may vary.

If fiber guides, such as the fiber guide $F_{41}$ shown in FIG. 25 and FIG. 26, are used as screen elements and if a multitude of such screen elements are arranged in one plane such that the axes of such screen elements are disposed parallel to one another and opposite end surfaces thereof are disposed in planes parallel to one another, a straight plate consisting of a multitude of fiber guides having parallel opposite surfaces can be produced.

Figure 29:
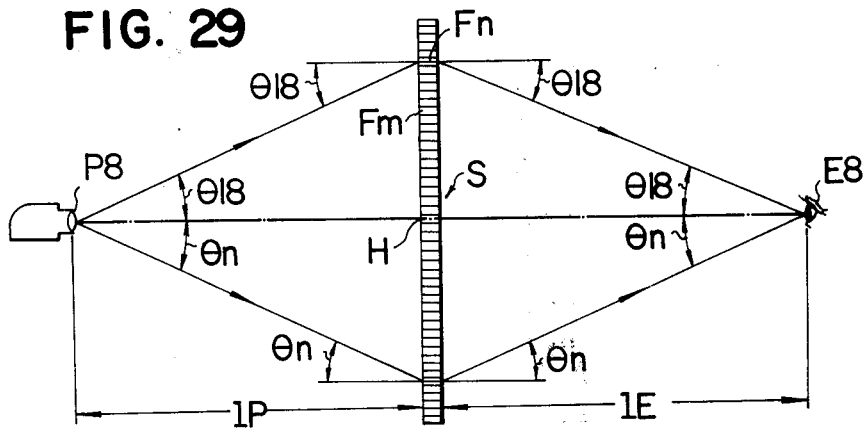
FIG. 29 is a schematic side view of a projected image observation device comprising a directional screen composed of fiber guides of the symmetrical type such as shown in FIG. 26.

FIG. 29 shows a projected image observation device which uses the aforesaid straight plate as a screen S. If a projector P8 is placed at a position spaced apart from screen S a distance lp where is squarely faces the screen, rays of light from projector P8 will be incident at an angle of incident $\theta_{18}$ on a screen element Fn disposed at a point on the screen S which is at an angle $\theta_{18}$ relative to the optical axis of the projector P8. As is clear from the path of light shown in FIG. 26, rays of light incident on screen element Fn will emerge therefrom at an angle of emergence $\theta_{18}$ and move obliquely downwardly till they reach a spot E8 disposed on an extension of a perpendicular P8H extending from projector P8 to screen S in coincidence with the projector's optical axis. At this time, the rays of light form an angle $\theta_{18}$ with a line HE8. Accordingly as is clear from FIG. 29, the distance lp from screen P8 to screen S is equal to the distance lE from screen S to spot E8.

The aforesaid relation holds with any screen element Fm of screen S. Thus, all the rays of light thrown by projector P8 on screen S converge on spot E8. Accordingly, it will be possible to see a full image formed on screen S without any portion of the image being missed if the eyes are disposed at spot E8.

It is important that the diameter of the screen elements be sufficiently small relative to the effective diameter of the projection lens and an observation distance lE to permit at least a portion of the rays of light forming an image on the screen to fall on the eyes of an observer even if the light ray incident points are vertically displaced from the light ray emerging points as shown in FIG. 26. It is also important that the inversion of component parts of an image on the screen due to vertical or horizontal inversion of curves produced by the fiber guide shown in FIG. 25 be made negligible for the resolving power of the observer's eyes at the observation distance lE. The size of inverted image E51 is equal to the diameter of each of the screen elements.

As aforementioned, the optical properties of a screen comprising a multitude of fiber guides as screen elements arranged in mass formation are similar to those of a screen comprising a multitude of spherical lens system arranged in mass formation. And yet, the screen composed of fiber guides has an advantage over the screen composed of spherical lens systems in that it is much easier to produce. In one process of production of the former, a screen can be readily produced by arranging fiber guides of a predetermined length with their optical axes disposed parallel to one another and then adhering them together. In another process of production, fiber guides cut to a slightly larger length than is necessary may be joined together and then opposite ends of such fiber guides may be ground to obtain a predetermined length of fiber guide. In any event, the former screen can be produced readily irrespective of which process of production is used. The former screen is more highly resistant to buckling than the latter screen, although buckling of screens comprising a multitude of fiber guides as screen elements is negligible for practical purposes.

Figure 30:
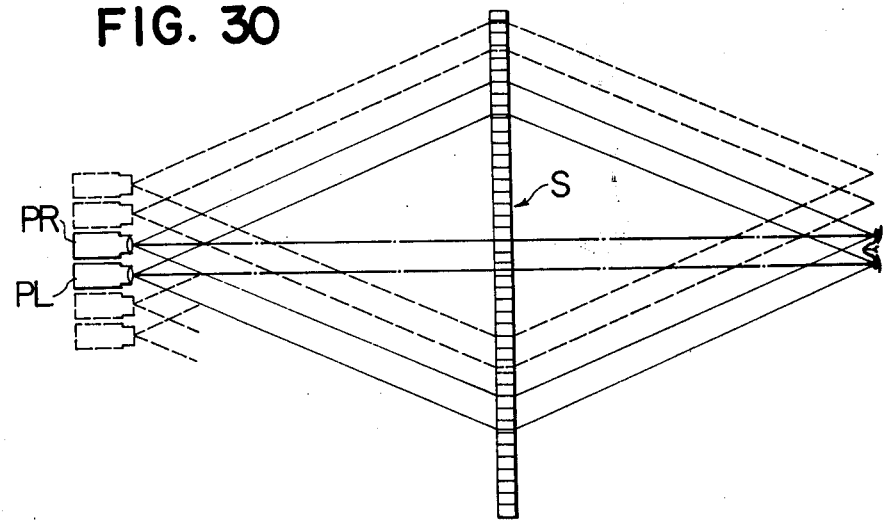
FIG. 30 is a schematic plan view of another embodiment of the projected image observation device of FIG. 29.

FIG. 30 shows a number of projectors arranged horizontally in side-by-side relationship and suitably spaced-apart for observing stereoscopic images thrown on a screen comprising a multitude of fiber guides as screen elements. For example, if original pictures for the right eye of an observer are projected by projector $P_R$ and those for the left eye by projector $P_L$, and if the face of the observer is disposed in a position symmetrical with the positions of the projectors, it will be possible to see stereoscopic images on the screen. If a number of pictures are arranged in side-by-side relationship and a series of continuous original pictures for stereoscopic presentation are projected on the screen successively from the projectors starting from, say, the leftmost projector and ending at the rightmost projector, it will be possible to successively see continuous stereoscopic images varying one after another by merely turning one's head from left to right.

Figure 31:
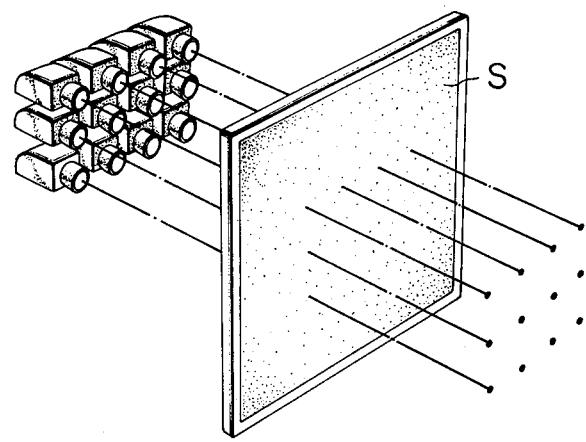
FIG. 31 is a schematic perspective view of another embodiment of the projected image observation device of FIG. 29.

If projectors are arranged in side-by-side relationship not only horizontally but also vertically as shown in FIG. 31, it will be possible to see on the screen S images which are little short of so-called three-dimensional stereoscopic images.

Figure 32:
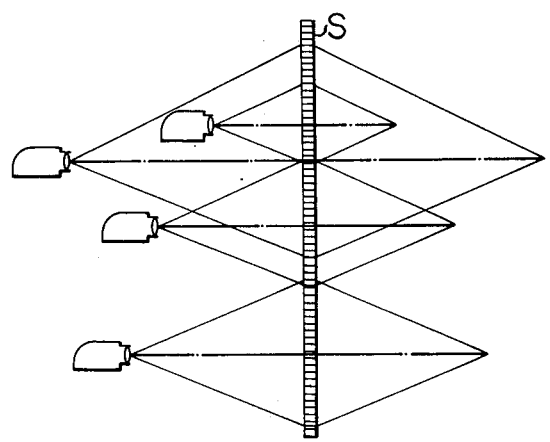
FIG 32 is a schematic side view of a further embodiment of the projected image observation device of FIG. 29.

In FIG. 32, a plurality of projectors are arranged vertically, horizontally, forwardly and rearwardly in any positions as desired with respect to the screen S, so that images on the screen S can be seen from positions which re symmetrical with the projectors with respect to the screen. In this case, the images simultaneously formed on the screen are equal in number to the projectors. However, since the screen S is directional, it will be readily understood that an observer positioned symmetrically with one of such projectors with respect to the screen only sees the image formed on the screen by the particular projector disposed symmetrically with him, the images formed by other projectors not being in his field of view.

Figure 33:
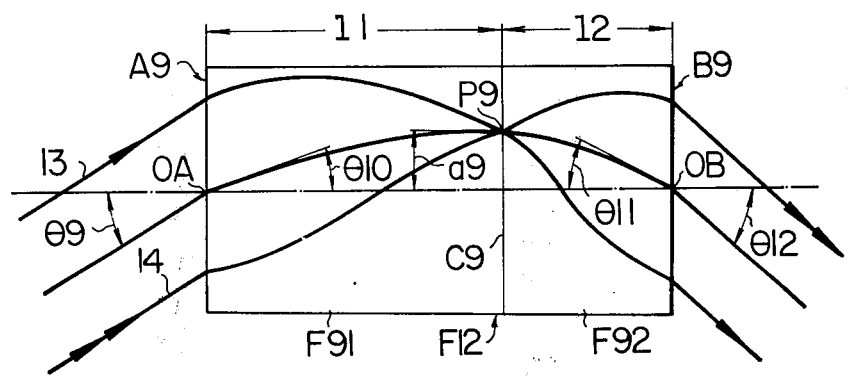
FIG. 33 is a view illustrating the manner in which rays of light move through a fiber guide of one asymmetrical type made by joining together two fiber guide segments.

In FIG. 29, a projector is disposed in a position which is symmetrical with the position of an observer on the opposite side of the screen S. However, when fiber guides of the asymmetrical type shown in FIG. 33, presently to be described, are used, it is possible to provide a projected image observation device in which the position of the projector is asymmetrical with the position of a viewer with respect to the screen. The optical properties and operation of fiber guides of the asymmetrical type will not be explained.

In producing fiber guides of the asymmetrical type, a fiber guide segment $F_{91}$ of a radius $r$, an index of refraction $n$ at its center, a difference in index of refraction between its center and its outer periphery $\Delta n1$, a period length $L_1$, and a length $l_1 = \frac{1}{4} L_1$ and another fiber guide segment $F_{92}$ of a radius $r$, an index of refraction $n$ at its center, a difference in index of refraction between its center and its outer periphery $\Delta n2$, a period length $L_2$, and a length $l2 = \frac{1}{4} L_2$ are joined together, for example, at their end suraces while their center or optical axes are aligned with each other. That is, fiber guide segments $F_{91}$ and $F_{92}$ are joined to each other at a border surface C9 and have open end surfaces $A_9$ and $B_9$ respectively.

Such a fiber guide of an asymmetrical type, composed of two fiber guide segments $F_91$ and $F_92$, has optical properties such that parallel rays of light incident on one end surface $A_9$ at an angle $\theta 9$ with respect to the optical axis converge on a point $P_9$ in internal border surface $C_9$ and emerge from the other end surface $B_9$ at an angle $\theta 12$ with respect to the optical axis. This will be clearly understood if one considers border surface $C_9$ to be the center cross-section $C_{41}$ described with reference to FIG. 26.

Accordingly, when the angular relationship between the incident rays of light and emerging rays of light is only to be considered, one has merely to examine one principal ray of light, for example, which is incident on one end surface $A_9$ at its central point $O_A$ and which is easy to calculate. To enable FIG. 33 to be clearly understood in relation to FIG. 26 two rays of light 13 and 14, in addition to the principal ray entering the end surface $A_9$ at its central point $O_A$, which converge on point $P_9$ on border surface $C_9$ are shown.

The principal ray of light incident on one end surface $A_9$ at an angle $\theta_9$ with respect to the optical axis is introduced into fiber guide segment $F_{91}$ at an angle of refraction $\theta_{10}$ and moves through it in a sine curve. It becomes parallel to the optical axis at a point on border surface $C_9$ where it is spaced from the optical axis a distance $a_9$. It is introduced at this point on border surface $C_9$ into fiber guide segment $F_{92}$ and moves through it toward a central point $O_B$ of the other end surface $B_9$ in a cosine curve at an angle $\theta_{11}$ with respect to central point $O_B$. It is refracted at the central point $O_B$ and emerges from fiber guide segment $F_{92}$ at an angle $\theta_{12}$ with respect to the optical axis.

Thus, the following relation holds:

$$\frac{\sin \theta_9}{\sin \theta_{10}} = \frac{\sin \theta_{12}}{\sin \theta_{11}} = n \qquad (4)$$

The above formula is transformed into the following:

$$\frac{\sin \theta_9}{\sin \theta_{12}} = \frac{\sin \theta_{10}}{\sin \theta_{11}} \qquad (5)$$

If an X axis is drawn horizontally to the right and a Y axis is drawn upwardly from the central point $O_A$ of one end surface $A_9$ taken as the origin, the sine curve of the principal ray moving through fiber guide segment $F_{91}$ can be expressed by the following formula:

$$Y = a_9 \sin\left(\frac{\pi}{2} \times \frac{X}{l1}\right)$$

Thus, the gradient $\tan \theta_{10}$ of the line tangent to the sine curve at point $O_A$ is as follows:

$$\tan \theta_{10} = \left(\frac{dy}{dx}\right)\big|_{X=0}$$

$$= \frac{d}{dx}\left(a_9 \sin \frac{\pi}{2} \times \frac{X}{l1}\right)\big|_{X=0}$$

$$= \frac{a_9 \pi}{2 l1}$$

The following relation is obtained based on the same concept as described above:

$$\tan \theta_{11} = \frac{-a_9 \pi}{2 l_2}$$

so that $$\frac{\tan \theta_{10}}{\tan \theta_{11}} = -\frac{l2}{l1} \quad (6)$$

Figure 34:
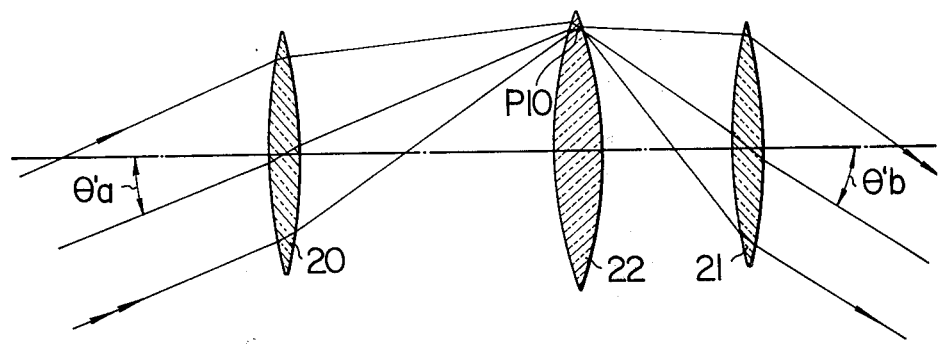
FIG. 34 is a side view of a lens system for comparison with the fiber guide of one asymmetrical type of FIG. 33.

The fiber guide $F_{12}$ described above has the same optical properties and operation as the spherical lens system shown in FIG. 34. The lens system shown in FIG. 34 is similar to the lens system shown in FIG. 28 in that the optical axes of lenses 20, 22 and 21 coincide with one another, and the focuses of lenses 20 and 21 are disposed in the vicinity of a central point of lens 22 and coincide with each other. In the lens system of FIG. 34, however, the focal lengths of lenses 20 and 21 differ from each other, with the focal length of lens 20 being greater than that of lens 21, and the focal length of lens 22 in such that rays of light emerging from lens 20 converge on a central point of lens 21.

Preferably, rays of light emerging from the central point of lens 20 become parallel to the optical axis within lens 22 and converge on a central point of lens 21. This relationship can be expressed in terms of previously cited formula (A) if the lens system is sufficiently thin, where $f_1$ is the focal length of lens 20 and $f_2$ and $f_3$ are the focal lengths of lenses 21 and 22 respectively. This relationship also holds for the lens system shown in FIG. 28 in which $f_1 = f_2$.

As similarly noted in connection with FIGS. 1 and 2, when parallel rays of light are incident on the lens 20 of the lens system of FIG. 34 at an angle $\theta'a$ with respect to the optical axis, such rays of light form an image at a point P10 substantially on a central plane of lens 22 and then emerge from lens 21 in the form of parallel rays of light. In this instance, the emerging angle $\theta'b$ is not equal to the incidence angle $\theta'a$. As can be clearly seen in the figure, the relationship between $\theta'a$ and $\theta'b$ is substantially the same as in previously cited formula (B). This relationship also holds with the lens system of FIG. 28.

It is apparent from the foregoing description, that the fiber guide $F_{12}$ of an asymmetrical type shown in FIG. 33 operates in the same manner and achieves the same results as the thin lens system shown in FIG. 34.

Figure 35:
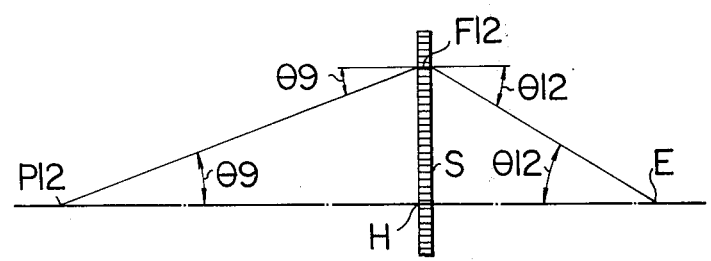
FIG. 35 is a schematic side view of a projected image observation device comprising a direction screen composed of the fiber guides of one asymmetrical type of FIG. 33.

FIG. 35 shows a projected image observation device composed of fiber guides of an asymmetrical type, such as $F_{12}$ shown in FIG. 33, as screen elements. In the figure a ray of light thrown from a projector P12 on a screen element $F_{12}$ forms and angle $\theta_9$ with the optical axis of screen element $F_{12}$ which is equal to the angle formed by the ray of light and line $P_{12}H$ drawn from projector $P_{12}$ perpendicular to the screen S. Likewise, the ray of light when emerging from screen element $F_{12}$ forms an angle $\theta_{12}$ with the optical axis thereof which is equal to the angle formed by the ray of light and an extension of the aforesaid perpendicular at the intersection point E.

Thus, $$\frac{\tan \theta_9}{\tan \theta_{12}} = \frac{\frac{HF_{12}}{P_{12}H}}{\frac{HF_{12}}{EH}} = \frac{EH}{P_{12}H} \quad (7)$$

where $P_{12}H$ is a constant. Therefore, $EH$ will also be a constant if $\tan \theta_9/\tan \theta_{12}$ is a constant, and the rays of light thrown from the projector $P_{12}$ will converge on spot E regardless of the size or span of the light flux HF12.

If $\theta_9$, $\theta_{10}$, $\theta_{11}$ and $\theta_{12}$ in FIG. 33 are small enough, the following approximate formula will be obtained by using formulas (5) and (6):

$$\frac{\tan \theta_9}{\tan \theta_{12}} \approx \frac{\sin \theta_9}{\sin \theta_{12}} = \frac{\sin \theta_{10}}{\sin \theta_{11}} \approx \frac{\tan \theta_{10}}{\tan \theta_{11}} = -\frac{l2}{l1} \quad (8)$$

That is, $$\frac{\tan \theta_9}{\tan \theta_{12}} \approx -\frac{l2}{l1} = \text{A constant} \quad (9)$$

When calculated in detail, this approximate formula has an error of less than 10% in the range of actual application ($n = 1.6$; $\Delta n2/\Delta n1 \leq 5$; and $\theta_9 \leq 15°$).

Accordingly, all the rays of light thrown by projector P12 coverge on spot E with an error of a certain range, so that it will be possible to see clearly images formed on the screen S by the rays of light from the projector P12 if the eyes of the observer are disposed at spot E.

If the fiber guide segment $F_{92}$ used in combination with the fiber guide segment $F_{91}$ to provide fiber guide F12 of an asymmetrical type is replaced by another type of fiber guide segment differing in optical properties from fiber guide segment $F_{92}$, it will be possible to vary the angle $\theta_{12}$ in FIG. 35. Therefore, if a screen is produced which comprises a plurality of asymmetrical types of fiber guides, such as three different asymmetrical types, for example, used in combination as screen elements, it will be possible to see an image projected on such a screen S from a projector on one side thereof, at three positions on the other side thereof lying on a straight line perpendicular to the screen in the manner such as shown in FIG. 11.

Three different asymmetrical types of fiber guides may be used in constructing a screen which would comprise these three types of fiber guides as screen elements. Such a screen would operate similarly to that shown in FIG. 12, with the numerals 1, 2 and 3 denoting different types of fiber guides of the asymmetrical type.

An indication device containing two symbols composed of two different asymmetrical types of fiber guides similar to that shown in FIG. 13 may also be constructed. The indication device would indicate marks X and O, and portions of the device other than the marks X and O are made of an opaque material. As will be understood with reference to FIG. 14, if rays of light are thrown from a projector at A onto the device after mounting an annular red filter in the projector about the peripheral portions and a green filter in the central portion, the mark X represented by elements 4 can be seen in green color at a point $B_1$, and the O mark represented by elements 5 can be seen in red color at a point $B_2$. Thus, this indication device permits one to see different symbols or patterns at different positions. It is possible to give different colors to the symbols or patterns. If light rays of a plurality of different colors or two colors, for example, are projected by two different light sources, it will be possible to separately turn on and off the light sources.

In the embodiments shown and described, a directional light transmitting screen according to this invention has been described as comprising thin lens systems, thick lens systems, fiber guides of the symmetrical type, fiber guides of one asymmetrical type, or fiber guides of two different asymmetrical types used in combination.

What I claim is:

1. A directional light transmitting screen comprising a plurality of adjacently disposed light-refracting systems as screen elements, each of said light-refracting systems having its own refractive power, optical axis, effective center plane, and two outermost surfaces with optical centers and diameters normal to said optical axis, and each of said systems comprising:

means for focusing parallel light rays incident upon one outermost surface thereof onto the effective center plane of the system, with the parallel ray which passes through the optical center of said one outermost surface directed substantially parallel to the optical axis of the system upon entering and leaving the effective center plane; and means for causing all of said parallel light rays to emerge from the system through the other outermost surface in parallel, the angle of said emerging parallel rays with the optical axis of the system being determined by the system refractive power and the angle of incidence with respect to the system optical axis of said parallel light rays on said one outermost surface; and wherein certain of said systems differ from others in refractive power.

2. A screen as in claim 1, wherein the optical axes of the light-refracting systems are parallel to one another.

3. A directional light transmitting screen comprising a plurality of adjacently disposed light-refracting systems as screen elements, each of said light-refracting systems having its own refractive power, optical axis, effective center plane, and two outermost surfaces with optical centers and diameters normal to said optical axis, and each of said systems comprising:

means for focusing parallel light rays incident upon one outermost surface thereof onto the effective center plane of the system, with the parallel ray which passes through the optical center of said one outermost surface directed substantially parallel to the optical axis of the system upon entering and leaving the effective center plane; and means for causing all of said parallel light rays to emerge from the system through the other outermost surface in parallel, the angle of said emerging parallel rays with the optical axis of the system being determined bu the system refractive power and the angle of incidence with respect to the system optical axis of said parallel light rays on said one outermost surface; and wherein certain of said systems have their optical axes arranged at an angle with respect to others of said systems.

4. A screen as in claimd 3 wherein all the light-refracting systems have the same refractive power.

5. A screen as in claim 3, wherein certain of the light-refracting systems differ from others in refractive power.

6. A directional light transmitting screen comprising a plurality of adjacently disposed light-refracting systems as screen elements, each of said light-refracting systems having its own refractive power, optical axis, effective center plane, and two outermost surfaces with optical centers and diameters normal to said optical axis, and each of said systems comprising:

means for focusing parallel light rays incident upon one outermost surface thereof onto the effective center plane of the system, with the parallel ray which passes through the optical center of said one outermost surface directed substantially parallel to the optical axis of the system upon entering and leaving the effective center plane; and means for causing all of said parallel light rays to emerge from the system through the other outermost surface in parallel, the angle of said emerging parallel rays with the optical axis of the system being determined by the system refractive power and the angle of incidence with respect to the system optical axis of said parallel light rays on said one outermost surface; and wherein said light-refracting systems are divided into two groups, each group forming a section of the screen and one section being arranged at an angle with respect to the other section so that two groups of light rays incident upon the respective sections of the screen cross one another after emerging therefrom.

7. A directional light transmitting screen comprising a plurality of adjacently disposed light-refracting systems as screen elements, each of said light-refracting systems having its own refractive power, optical axis, effective center plane, and two outermost surfaces with optical centers and diameters normal to said optical axis, and each of said systems comprising:

means for focusing parallel light rays incident upon one outermost surface thereof onto the effective center plane of the system, with the parallel ray which passes through the optical center of said one outermost surface directed substantially parallel to the optical axis of the system upon entering and leaving the effective center plane; and means for causing all of said parallel light rays to emerge from the system through the other outermost surface in parallel, the angle of said emerging parallel rays with the optical axis of the system being determined by the system refractive power and the angle of incidence with respect to the system optical axis of said parallel light rays on said one outermost surface; and wherein at least one of said light-refracting systems comprises two outer thin lens elements and two inner spaced thin lens elements, the latter having focal lengths $f_a$ and $f_b$, and the angle of incidence $\theta''_a$ on said one outermost surface and the angle of emergence $\theta''_b$ from said other outermost surface of a principal ray with respect to the optical axis of said one of said light-refracting system are related by:

$$\tan \theta''_b / \tan \theta''_a = f_a/f_b.$$

8. A directional light transmitting screen comprising a plurality of fiber guides of one asymmetrical type used as screen elements, each of said fiber guides comprising two fiber guide segment of the same radius having opposite end surfaces disposed in planes parallel to each other and normal to the axis of each fiber guide segment, one of said two fiber guide segments having an index of refraction $n_1 = n_{o1}(1 - \frac{1}{2} a_1 X^2)$ where $n_{o1}$ is the index of refraction of said one fiber guide segment on its axis and $a_1$ is a positive proportional constant determined by the focal length of said one fiber guide segment and with a length $l = \frac{1}{4} \cdot L_1$, where $L = 2\pi/\sqrt{a_1}$, and the other fiber guide segment having index of refraction $n_2$ at a point spaced apart from said axis a distance X which can be approximately expressed by the relationship of said other fiber guide segment on its axis and $a_2$ is a positive constant determined by the focal length of said other fiber guide segment and with a length $l_2 = \frac{1}{4} \cdot L_2$, where $L_2 = 2\pi/\sqrt{a_2}$, said two fiber guide segments being joined together at their end surfaces with their axes aligned with each other to form a fiber guide of one asymmetrical type.

9. A directional light transmitting screen comprising a plurality of fiber guides of different asymmetrical types used as screen elements, each of the fiber guides of one asymmetrical type comprising two fiber guide segments of the same radius having opposite end surfaces disposed in planes parallel to each other and normal to the axis of each fiber guide segment, one of said two fiber guide segments having an index of refraction $n_1$ at a point spaced apart from said axis a distance X which can be approximately expressed by the relationship $n_1 = n_{o1}(1 - \frac{1}{2} \cdot a_1 X^2)$ where $n_{o1}$ is the index of refraction of said one fiber guide segment on its axis and $a_1$ is a positive proportional constant determined by the focal length of said one fiber guide segment, and with a focal length $l_1 = \frac{1}{4} \cdot L_1$ where $L_1 = 2\pi/\sqrt{a_1}$, the other fiber guide segment of said two segments having an index of refraction $a_2$ at a point spaced apart from said axis the distance X which can be approximately expressed by the relationship $n_2 = n_{o2}(1 - \frac{1}{2} \cdot a_2 X^2)$ where $n_{o2}$ is the index of refraction of said other fiber guide segment, and with a length $l = \frac{1}{4} \cdot L_2$, where $L_2 = 2\pi/\sqrt{a_2}$, said two fiber guide segments being joined together at their end surfaces with their axes aligned with each other to produce the fiber guides of one asymmetrical type, and each of the fiber guides of different asymmetrical types having the same structural relationships as each of said fiber guides of said one asymmetrical type but differing therefrom in the values of their constants $a_1$ and $a_2$.

* * * * *